US006769067B1

United States Patent
Soong

(10) Patent No.: US 6,769,067 B1
(45) Date of Patent: Jul. 27, 2004

(54) METHOD AND SYSTEM FOR NETWORK COMMUNICATION CONTROL AND SECURITY

(76) Inventor: James W. Soong, 521 Susana Ave., Redondo Beach, CA (US) 90277

( * ) Notice: Subject to any disclaimer, the term of this patent is extended or adjusted under 35 U.S.C. 154(b) by 0 days.

(21) Appl. No.: 09/472,275

(22) Filed: Dec. 27, 1999

(51) Int. Cl.[7] .............................................. H04L 9/32
(52) U.S. Cl. ..................................................... 713/201
(58) Field of Search ............................. 713/201, 200; 345/752; 709/206

(56) References Cited

U.S. PATENT DOCUMENTS

| | | | |
|---|---|---|---|
| 5,003,575 A | * 3/1991 | Chamberlin et al. | 379/88.26 |
| 5,872,925 A | * 2/1999 | Han | 709/206 |
| 5,878,230 A | * 3/1999 | Weber et al. | 709/238 |
| 5,917,489 A | * 6/1999 | Thurlow et al. | 345/809 |
| 5,958,005 A | * 9/1999 | Thorne et al. | 709/202 |
| 6,108,691 A | * 8/2000 | Lee et al. | 709/206 |
| 6,230,186 B1 | * 5/2001 | Yaker | 709/206 |
| 6,591,291 B1 | * 7/2003 | Gabber et al. | 709/206 |

OTHER PUBLICATIONS

Rick Winter and Patty Winter, "Microsoft Office 97 User Manual—The Manual You Should Have Received with Office 97", pp. 635,639,670, 1998.*

* cited by examiner

Primary Examiner—Matthew Smithers
Assistant Examiner—Andrew Nalven

(57) ABSTRACT

A method and system for controlling email transmission includes creating a first email by a first user having an email address in the first email. The first email is sent to a second user. The first email is attached to a second email. The second email, including the first email, is forwarded to a third user. The third user is controlled in creating a third email to reply to the first user after the third user's receipt of and access to the second email and the first email. Various control options in control modes and access denial modes control creation of the third email.

38 Claims, 9 Drawing Sheets

US 6,769,067 B1

METHOD AND SYSTEM FOR NETWORK COMMUNICATION CONTROL AND SECURITY

FIELD OF THE INVENTION

The present invention relates to remote communications and, more specifically, to email control and security.

BACKGROUND

Electronic mail, or email, is an increasingly popular way to communicate. With the growing number of computers, and other networked devices and their connectivity over the Internet, email will likely continue to be one preferred method for communication. Advances in networking technologies have helped to improve and refine the utility and ease of email usage. The versatility in the use of email stems from the ability of computer users to readily send and receive email messages on various computer platforms running various operating systems and email programs.

Typically, email is possible through the use of an email program. Such an application program allows for the creation, transmission, receipt, and review of email over local or remote area networks, or the Internet. The relative ease of these application programs facilitates great freedom and versatility in communicating through email. For example, one user of an email program can create an email and transmit the email to a second user. Upon receipt of the email, the second user, who may not necessarily use the same email program as the first user, can receive and access the contents of the email. In response to the email, the second user can create a reply in the form of another email for transmission to the first user. As another possibility, the second user could choose to forward the email of the first user to a third user. In conventional email programs, forwarding an email to another is simple. Very often the forwarding of email requires only click(s) with a mouse, or other similar input device, on an appropriate icon, or other prompt, enabling forwarding of the message.

The third user who received a forwarded email likewise accesses the forwarded email with relative ease. Usually, the email program provides the third user with some identifying distinction between the contents of the forwarded email and accompanying contents of a message, if any, by the second user. The third user accesses forwarded email of the first user or the email of the second user by, for example, an appropriate mouse click, on the desired email. After accessing and reviewing either email, the third user can communicate with the author of the selected email with another click of a mouse on an appropriate icon enabling a reply. In light of the ease in creating, forwarding, and replying to email, it would be highly advantageous to provide selective control and security over the flow of email, when desired.

SUMMARY OF THE INVENTION

The present invention solves the problems associated with the prior art by providing methods and systems for providing network communication control and security.

In accordance with one aspect of the present invention, a method and system for controlling email transmission includes creating a first email by a first user having an email address in the first email. The first email is sent to a second user. The first email is attached to a second email. The second email, including the first email, is forwarded to a third user. The third user is controlled in creating a third email to reply to the first user after the third user's receipt of and access to the second email and the first email.

In another aspect of the present invention, a control mode having at least one control option is activated to selectively control the third user in replying to the first user.

In yet another aspect of the present invention, an access denial mode is activated to prohibit the third user in replying to the first user.

These and various other embodiments of the present invention, as well as the advantages and features of all of its many embodiments, are described in more detail in conjunction with the text below and attached figures.

DETAILED DESCRIPTION OF THE SPECIFIC EMBODIMENTS

Figure 1:
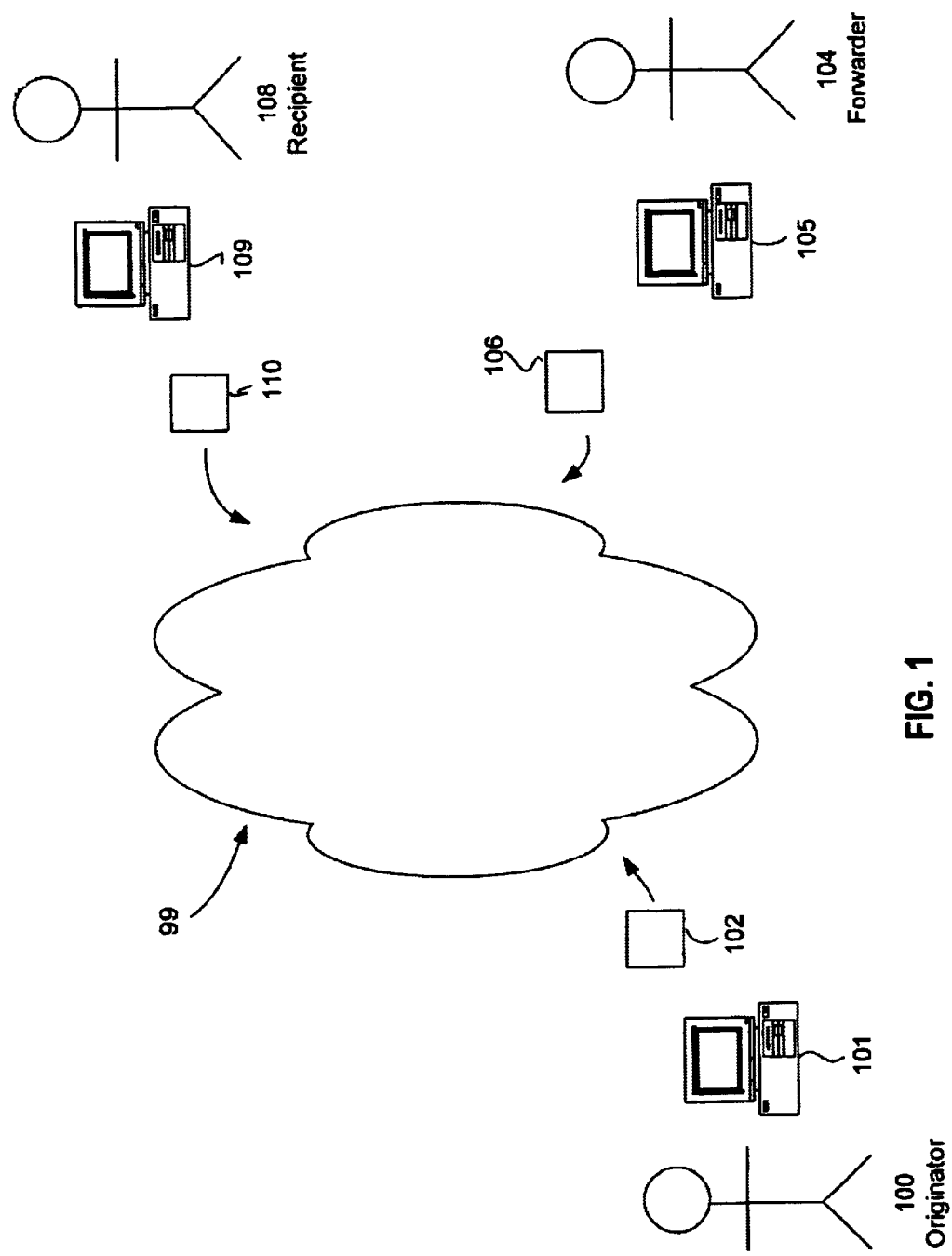
FIG. 1 shows a network linking electronic devices in accordance with one of many embodiments of the present invention.

Email systems involve the transmission of messages over communications networks. Many electronic communications networks have an email system. Some email systems are confined to a single computer system or network, but others have gateways to other computer systems, enabling users to send email anywhere in the world.

Most email systems include a text editor for composing messages, but many allow edits to messages using any desired text editor. The message is then sent to an intended person or destination recipient by specifying the person or destination's address. The same message can also be sent to several users at once, in a manner commonly referred to as broadcasting. A file attached to an email message is an attachment. Some email systems only support sending text files as email. In that case, if the attachment is a binary or formatted text file (such as an MS-Word document), it must be encoded before it is sent and decoded once it is received. There are a number of encoding schemes. Two examples are Uuencode and MIME. Other email systems also support non-text files, such as graphics, video, audio, etc.

Sent messages are stored in electronic mailboxes until a user fetches them. A mailbox is an area in memory or on a storage device where email is placed. In email systems, each user has a private mailbox. When the user receives email, the mail system automatically puts it in the mailbox. The mail system allows you to, for example, scan mail that is in your mailbox, copy it to a file, delete it, print it, or forward it to another user. If you want to save mail, it is a good idea to copy it to a file, because files tend to be more stable than mailboxes. To see if you have any mail, you may have to check your email mailbox periodically, although many systems alert you when mail is received. After reading your mail, you can store it in a text file, graphics file, or other file, depending on the nature of the mail, forward it to other users, or delete, or save it. Copies of email can be printed out on a printer if you want a paper copy.

Many online services and Internet Service Providers (ISPs) offer email, and most also have gateways so that you can exchange mail with users of other systems. Usually, it takes only a few seconds or minutes for mail to arrive at its destination. This is a particularly effective way to communicate with a group because you can broadcast a message to everyone in the group at once.

Although different email systems use different formats, there are some standards that are making it possible for users on all systems to exchange messages. For example, with respect to personal computers, an important email standard is MAPI, which stands for Messaging Application Programming Interface, a system built into Microsoft Windows that enables different email applications to work together to distribute mail. As long as both applications are MAPI-enabled, they can share mail messages with each other. The CCITT standards organization has developed the X.400 standard, which attempts to provide a universal way of addressing messages. To date, though, the de facto addressing standard is the one used by the Internet system because almost all email systems have an Internet gateway. MIME, which stands for Multipurpose Internet Mail Extensions, is a specification for formatting non-ASCII messages so that they can be sent over the Internet. Many email clients now support MIME, which enables them to send and receive graphics, audio, and video files via the Internet mail system. In addition, MIME supports messages in character sets other than ASCII. There are many predefined MIME types, such as GIF graphics files and PostScript files. It is also possible to define your own MIME types. In addition to email applications, web browsers also support various MIME types. This enables the browser to display or output files that are not in HTML format.

Email systems can be available from web-browser based providers. One example is Hotmail from Microsoft. Email systems can also be available from non-browser based email programs such as Microsoft Outlook, Lotus Notes, Eudora from Qualconum, and Groupwise from Novell, and the like. The operation of such systems is well known to one of ordinary skill in the art.

SMTP (Simple Mail Transfer Protocol) is a TCP/IP protocol used in sending and receiving e-mail. However, since it is limited in its ability to queue messages at the receiving end, it is usually used with one of two other protocols, POP3 or IMAP, that let the user save messages in a server mailbox and download them periodically from the server. In other words, users typically use a program that uses SMTP for sending e-mail and either POP3 or IMAP for receiving messages that have been received for them at their local server. Most mail programs such as Eudora let you specify both an SMTP server and a POP server. On UNIX-based systems, sendmail is the most widely-used SMTP server for e-mail. A commercial package, Sendmail, includes a POP3 server and also comes in a version for Windows NT. SMTP usually is implemented to operate over TCP port 25. The details of SMTP are in RFC 821 of the Internet Engineering Task Force. An alternative to SMTP that is widely used in Europe is X.400.

The method and system for remote communication control of the present invention relates to controlling the transfer of electronic messages. Electronic messages for purposes of the present invention include communications and messages, which can be text, graphic, video, audio, or the like, or combinations thereof, originated by or received by computers, Internet appliances, personal digital assistants (PDAs), cellular or mobile phones, set top boxes, and the like, and any other devices that can receive and transmit electronic messages over wired or wireless networks (hereinafter "devices"). Electronic messages of all of these devices, as just described, are, for convenience, referred to as "email" for the purposes of the present invention. In other words, the term "email" is used for purposes of the present invention to describe any and all electronic messages created, sent, or received by all of such devices. The operation and network capabilities and connectivity of such devices, and their ability and technique to send email, are well known to one of ordinary skill in the art and need not be discussed at length here FIG. 1 illustrates an originator 100 who creates an original email 102; a forwarder 104 who creates a forward email 106; and, a recipient 108 who creates a recipient email 110. The originator 100, forwarder 104, and the recipient 108 are communicatively linked over a network 99. The network 99 could be any kind of communications network, including, for example, the Internet. However, one skilled having ordinary skill in the art would appreciate that the network 99 could link the originator 100, the forwarder 104, and the recipient 108 over a private or public network of any size or scope. Also shown in FIG. 1 are electronic devices 101, 105, and 109 which are used by the originator 100, the forwarder 104, and the recipient 108, respectively, to create, transmit, and receive email. For ease of discussion and illustration, and to reduce unnecessary redundancy, only computers will exemplarily discussed in connection with the present invention as the electronic devices 101, 105, and 109. However, it should be manifestly clear that the present invention applies equally to other devices capable of sending and receiving email, although their operation may not be explicitly discussed. In addition, computer usage in connection with the present invention is described in light of a common graphical user interface (GUI) design in widespread use for email applications for ease of description and understanding. For example, common GUI designs allow for the sending, creating, accessing, forwarding, replying, etc. of email by an appropriate click or series of clicks on dedicated icons by a mouse or other kind of input device. However, it should be understood that the present invention applies equally to other GUIs and other various interfaces for all kinds of electronic devices that may not have this kind of precise design involving mouse clicks on icons.

The computers, as examples of electronic devices 101, 105, and 109 may be linked to computer modems to support communications using protocols such as TCP/IP (Transmission Control Protocol/Internet Protocol) or SLIP/PPP (Serial Link IP/Point-to-Point Protocol). As will be appreciated by those of ordinary skill in the art, other interactive communications media are possible as well. For example, the network 99 can include interactive television networks, telephone networks, wireless data transmission systems, two-way cable systems, customized computer networks, interactive kiosk networks, automatic teller machine networks, and the like, or combinations thereof.

Figure 1A:
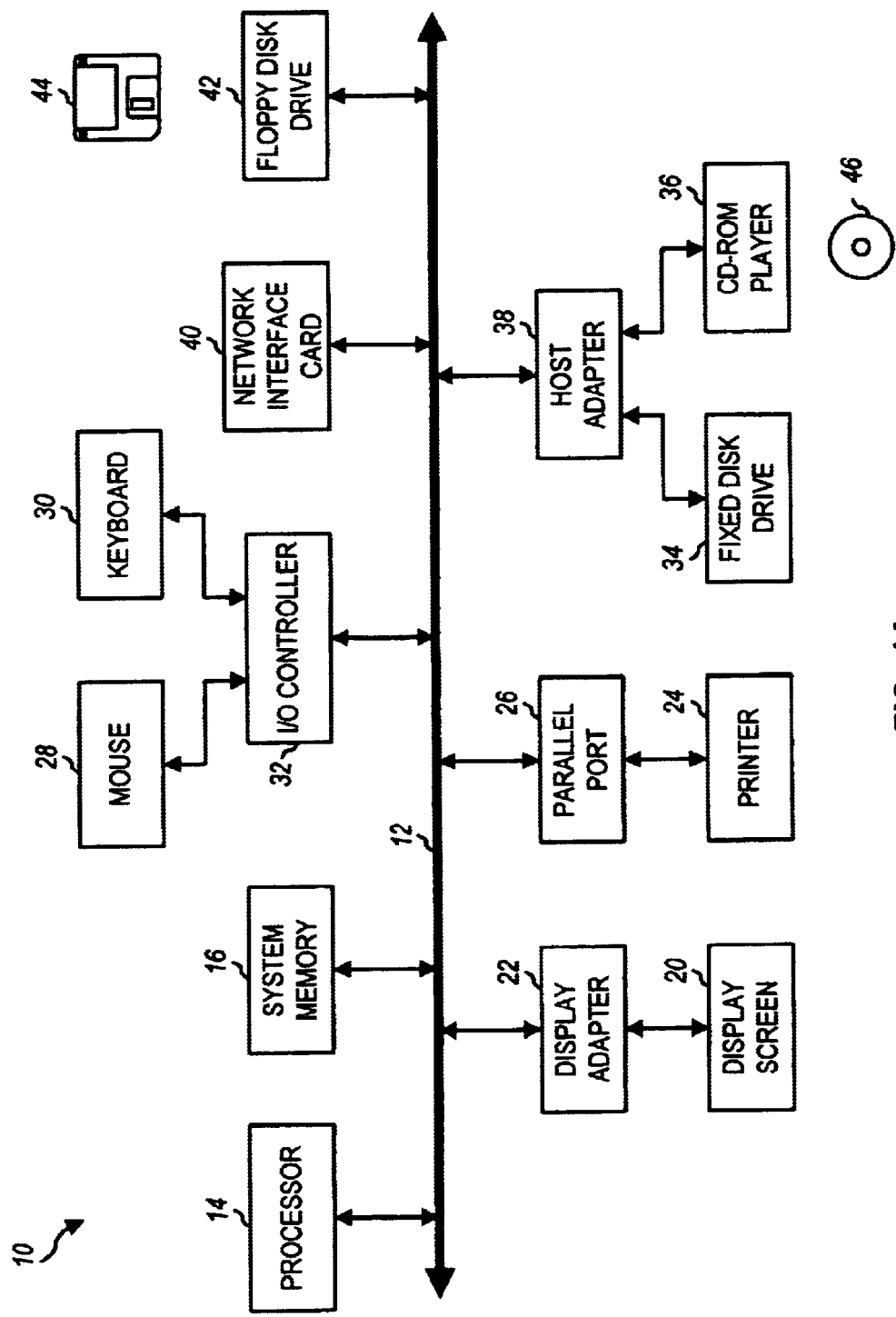
FIG. 1A shows a computer as an example of an electronic device in accordance with one of many embodiments of the present invention.

FIG. 1A illustrates basic subsystems of a computer system 10 suitable to implement the electronic devices 101, 105, 109 illustrated in FIG. 1. The computer system 10 includes a bus 12 that interconnects major subsystems such as a central processor 14, a system memory 16, and external devices such as a display screen 20 via a display adapter 22, a printer 24 via a parallel port 26, a mouse 28 and a keyboard 30 via an input/output (I/O) controller 32, a fixed disk drive 34, and a CD-ROM player 36 via a hose adapter 38, a network interface card 40, and a floppy disk drive 42 operative to receive a floppy disk 44.

Many other devices or subsystems (not shown) can be connected, such as a scanning device, a touch screen, and others. Also, it is not necessary for all of the devices show in FIG. 1A to be present to practice the present invention. Furthermore, the devices and subsystems may be interconnected in different ways from that shown in FIG. 1A. The operation of a computer system such as that shown in FIG. 1A is readily known in the art and is not discussed in detail here. Source code to implement some embodiments of the present invention, as discussed in more detail below, may be operatively disposed in system memory 16 or stored on storage media such as fixed disk drive 34, floppy disk 44, or a CD-ROM 46 that is operative with the CD-ROM player 36.

Portions of the following invention are now discussed in connection with the use of a common graphical user interface involving user inputs in the form of mouse click(s) on appropriate prompts, such as icons, and the like. Such GUIs are in common use with computers and are well known. In this regard, an appropriate selection or mouse click on, for example, a create or compose icon, forward icon, reply icon, transmit icon will accordingly cause an email to be created, to be forwarded, to be replied to, to be transmitted, respectively. However, the following discussion relating to such GUIs in a computer environment for the devices 101, 105, and 109 are for ease of illustration only. For example, the discussed techniques of inputting commands to, for example, create, transmit, attach, access, and open email with a mouse click on an icon are exemplary only. It will be readily appreciated that other techniques, including inputting commands to, for example, send, create, attach, access, and open email are possible depending on various factors such as the types of device 101, 105, and 109, the kind of operating systems for those devices, and the user interface for the devices. For example, a stylus might be used to enter information on a device, e.g., a PDA, to send an email. As another example, an audible command might be used to cause an email to be attached to another email for a device having voice recognition software. As yet another example, a keyboard might simply be used to type in such commands. Because explicit allusion to all the possibilities in interfacing with a device in an email system would be burdensome, and because they are well known, they are not discussed to any further extent. In discussing the following exemplary techniques for interfacing with a device in an email system in accordance with the present invention, it should emphasized that other techniques are within the scope and spirit of the present invention.

In accordance with the present invention, the originator 100 provides the original email 102 to the forwarder 104. Upon receipt and review of the original email 102, the forwarder 104 may find wish to provide the original email 102 to the recipient 108. In that event, the forwarder 104 creates the forward email 106 which attaches or otherwise contains the original email 102. The forward email 106, along with its attached original email 102, is then provided to the recipient 108. In a conventional manner, access to email can be accomplished by an appropriate selection of the email. Selection may be effected by a (double) click of a mouse on the email.

Upon receiving the forward email 106, the recipient 108 typically accesses and reads the forward email 106. Upon receipt or access of the forward email 106, the recipient 108 may also choose access to or selection of the original email 102 attached to the forward email 106 in a conventional manner, for example, the (double) click of a mouse on the attached original email 102. For any one of many possible reasons, the recipient 108 may then choose to reply to the forwarder 104 or the originator 100 with a reply email 110. In accordance with the present invention, new, innovative methods and systems are provided to allow control of the replies by the recipient 108 to the originator 100 or the forwarder 104. The present invention also provides security in selective nondisclosure of the email address of the originator 100. For reasons of security, privacy, access limitation, or other purpose, the originator 100, the forwarder 104, or the recipient 108 can selectively control communications by, and email address disclosures, of the originator 100, the forwarder 104, and the recipient 108.

Figure 1B:
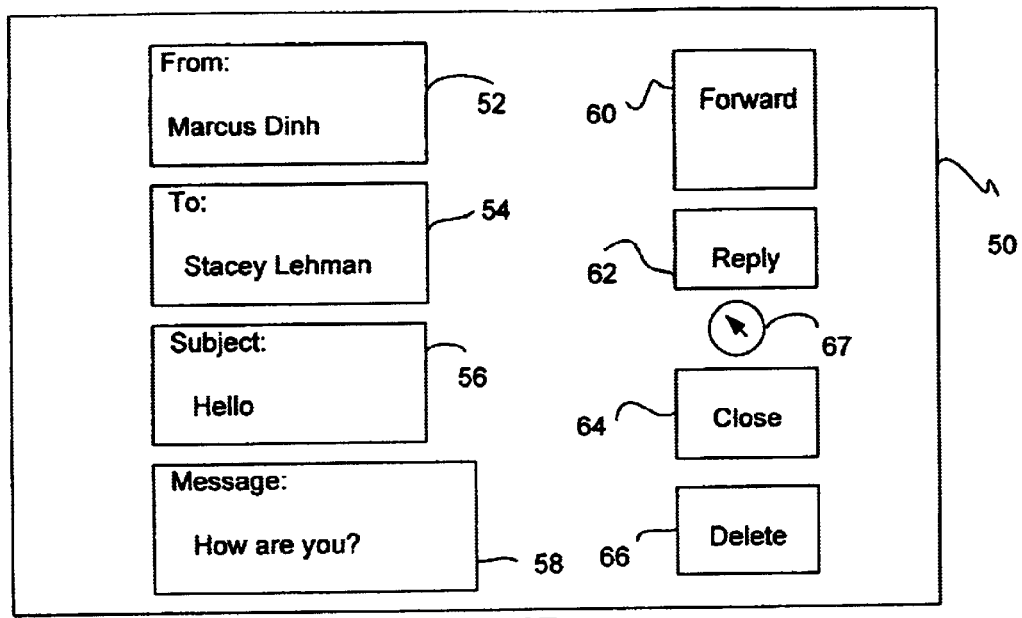
FIG. 1B shows a simplified, exemplary GUI for one email.

FIG. 1B illustrates a portion of a simplified exemplary GUI for an email 50 that has arrived in a person's mailbox. The email 50 includes many fields. A "from" field 52 shows the source of the email 50; a "to" field 54 shows the destination of the email 50; a "subject" field 56 shows the topic of the email 50; and a "message" field 58 shows the message of the email 50. The person who received the email 50 could respond to the email 50 in various ways using a forward icon 60, a reply icon 62, a close icon 64, or a delete icon 66, for example. To use any of these icons, which are well known, the person who received the email 50 would move a pointer 67, using, for example a mouse or other input device, and select the icon corresponding to the desired action.

Figure 1C:
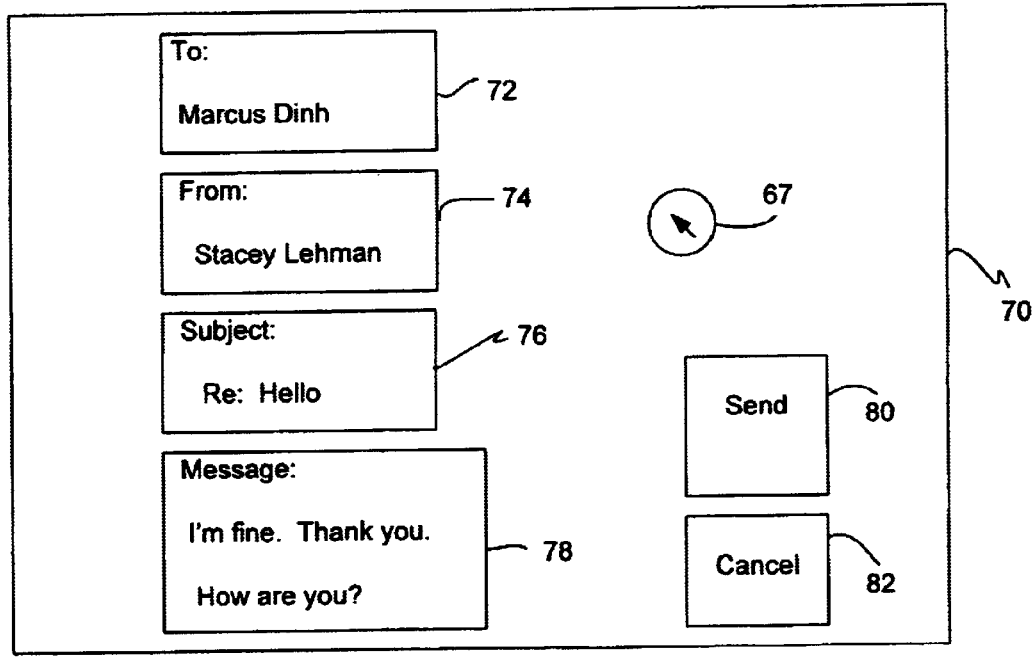
FIG. 1C shows a simplified, exemplary GUI for another email.

If the reply icon 62 is selected, a new email 70 is created. The email 70 could appear as exemplarily shown in FIG. 1C. The email 70 includes a "to" field 72, a "from" field 74, a "subject" field 76, and a message field 78. The email 70 also includes a send icon 80 and a cancel icon 82. An icon can be selected by the pointer 67. In conventional email systems, upon selection of the reply icon 62 before to create a response to the email 50, the "to" field 72 of the email 70 would be automatically entered with the email address or related indication of the source of the email 50 without the need for the person to laboriously enter the email address of the source. If a keyboard, for example, was used by the person as an input device, there would be no need for the person to manually enter keystroke-by-keystroke the email address of the source in the "to" field 72 during creation of the email 70. This conventional kind of automatic entry, and the like, of an email address may cause or facilitate inadvertent or unintended replies.

Figure 2:
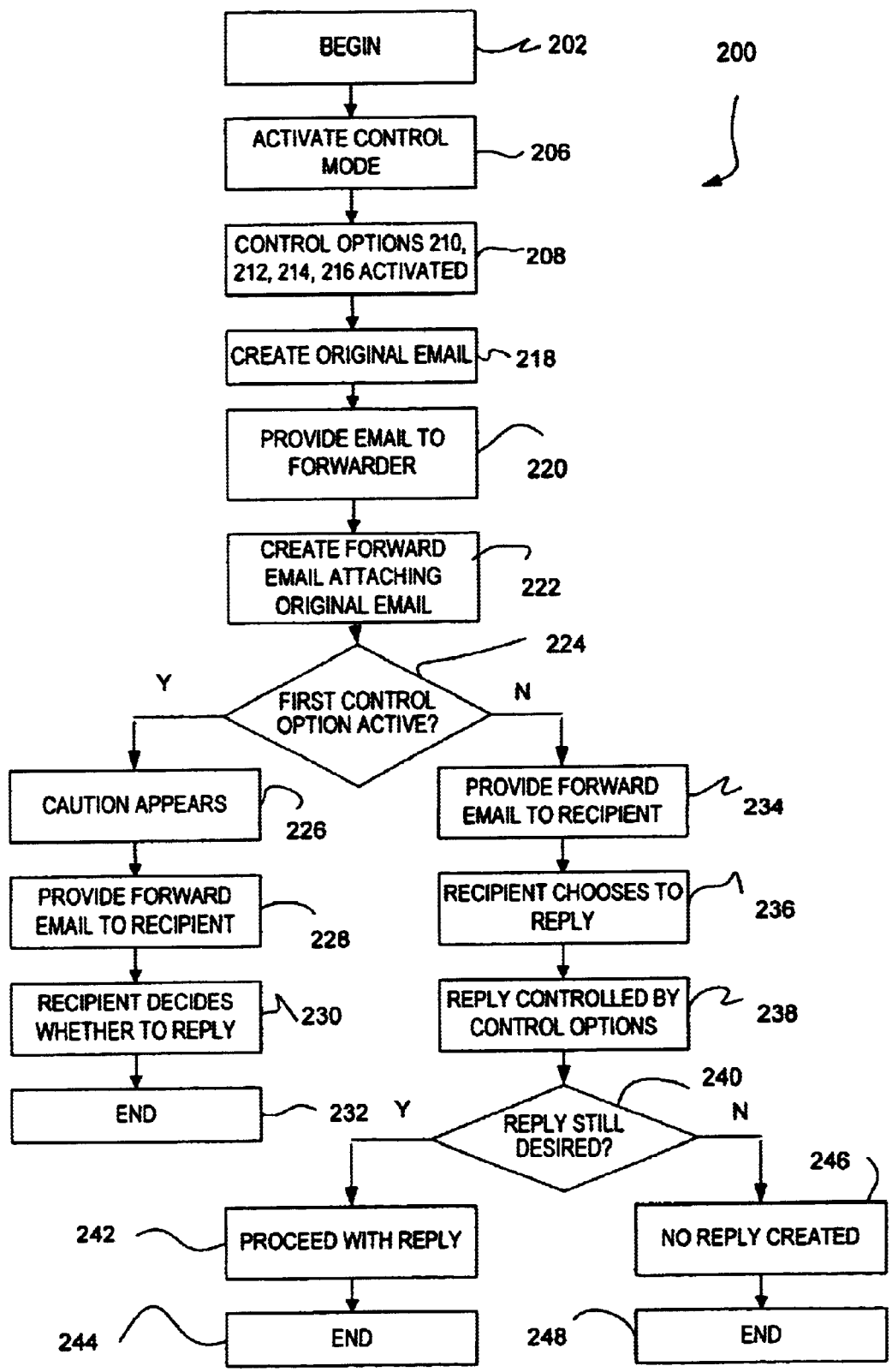
FIG. 2 shows a flow diagram of an originator-initiated control mode in accordance with one of many embodiments of the present invention.

FIG. 2 is a flow diagram of logic of an originator-initiated control mode 200 in accordance with one embodiment of the present invention. The originator-initiated control mode 200 allows the originator 100 to control inadvertent replies from the recipient 108 to the originator 100. At a step 202 the logic begins. The logic proceeds to a step 206 where the originator 100 activates the originator-initiated control mode. The logic 200 proceeds to a step 208 where one of four control options is available to control inadvertent replies from the recipient 108 to the originator 100 when the original email 102 is provided as an attachment to a forward email 106 by the forwarder 104. In one embodiment of the present invention, one or more of the four control options is selected by the originator 100. In a different embodiment, one or more of the four control options is active without affirmative selection by the originator 100.

A first control option 210 causes the appearance of a caution in the original email 102 when the original email is forwarded by the forwarder 104. In an embodiment of the present invention, the caution is a conspicuous message added to the text of the original email 102, indicating "Please do not inadvertently reply to the author of this email." Of course, other kinds of cautions having similar meaning are possible.

A second control option 212 causes the appearance of a caution in the original email 102, the forward email 106, or the reply email 110 after the recipient 108 chooses to reply by an appropriate mouse (double) click of a reply icon. In an embodiment of the present invention, the caution likewise is a conspicuous message added to the text of the email indicating "Please do not inadvertently reply to the author of this email." Of course, other kinds of cautions are possible.

A third control option 214 causes the appearance of a confirmation request after the recipient 108 chooses to reply by an appropriate mouse (double) click of a reply icon. The confirmation request appears in a pop-up window, asking the recipient 108 "Are you sure you want to reply to author of the attachment?" Of course, other confirmation requests having similar meaning or other methods to request confirmation that a reply is intended are possible. The pop-up window includes a yes icon and a no icon. Selection of the yes icon by the recipient 108 allows the recipient 108 to reply to the originator 100. Selection of the no icon by the recipient 108 causes abortion of the attempt by the recipient 108 to reply to the originator 100. Selection of the third control option 214 thus requires the recipient 108 to affirmatively confirm that the reply to originator 100 is intentional.

A fourth control option 216 temporarily modifies the normal function of the reply icon so that an appropriate mouse (double) click of the reply icon does not cause the email address of the originator 100 to automatically appear as a destination for the reply of the recipient 108. If the recipient 108 intends to reply to the originator 100, the recipient 108 must key in character by character the email address of the originator 100. Selection of the fourth control option 216 ensures that the recipient 108 is unlikely to mistakenly reply to the originator 100 by a hasty or thoughtless selection of the reply icon.

After selection of a control option, the logic proceeds to a step 218 where the originator creates the original email 102 subject to the control of the selected control option. The logic proceeds to a step 220 where the email is provided to the forwarder 104. The logic proceeds to step 222 where the forwarder 104 creates a forward email 106 and attaches thereto the original email 102. The logic proceeds to a decision step 224 where the logic determines if the originator selected the first control option 210. If the first control option 210 was selected, the logic proceeds to a step 226 where the caution of the first control option 210 is generated to appear in the original email 102. The logic proceeds to a step 228 where the forwarder 104 provides the forward email 106 with the original email 102 to the recipient 108. The logic proceeds to a step 230 where the recipient 108, after accessing the original email 102 and viewing the caution therein, decides whether to reply to the originator 100. The logic proceeds to a step 232 where the logic ends.

If the first control option 210 was not selected at the decision step 224, the logic proceeds to a step 234 where the forwarder 104 provides the forward email 106 with the original email 102 to the recipient 108. The logic proceeds to a step 236 where the recipient 108, after accessing the original email 102, chooses to reply to the originator 100 and appropriately selects a reply icon for such reply. The logic proceeds to a step 238 where the reply by the recipient 108 is appropriately controlled by the second control option 212, the third control option 214, or the fourth control option 216, as discussed above. If the second control option 212 was selected, the caution is displayed as a message to the recipient 108. If the third control option 214 was selected, the confirmation request is displayed to the recipient 108 who selects the yes icon or the no icon. If the fourth control option 216 was selected, the recipient 108 must first manually enter the email address of the originator 100 before replying to the originator 100.

From the step 238, the logic proceeds to a decision step 240. At the decision step 240, the recipient 108 considers whether a reply to the originator 100 is still desired. If a reply is still desired, the logic proceeds to a step 242 where the recipient 108 proceeds with the reply to the originator 100. For the second control option 212, the recipient 108 proceeds with creating the reply email 110 by inputting a message, for example, textual or graphical, and attaching a new attachment, if any, and providing the reply email 110 to the originator 100 by transmitting the reply with a selection, or (double) click, of an appropriate icon. For the third control option 214, the yes icon is first selected and the logic proceeds in like manner as the second control option 212, as just described. For the fourth control option 216, the email address of the originator 100 is manually, audibly, or otherwise, entered before the logic proceeds in like manner as the second control option 212, as just described. The logic proceeds from the step 242 to a step 244 where the logic ends. If a reply is not desired at the decision step 240, the logic proceeds to a step 246 where no reply by the recipient 108 is created for the originator 100. From the step 246, the logic proceeds to a step 248 where the logic ends.

Figure 3:
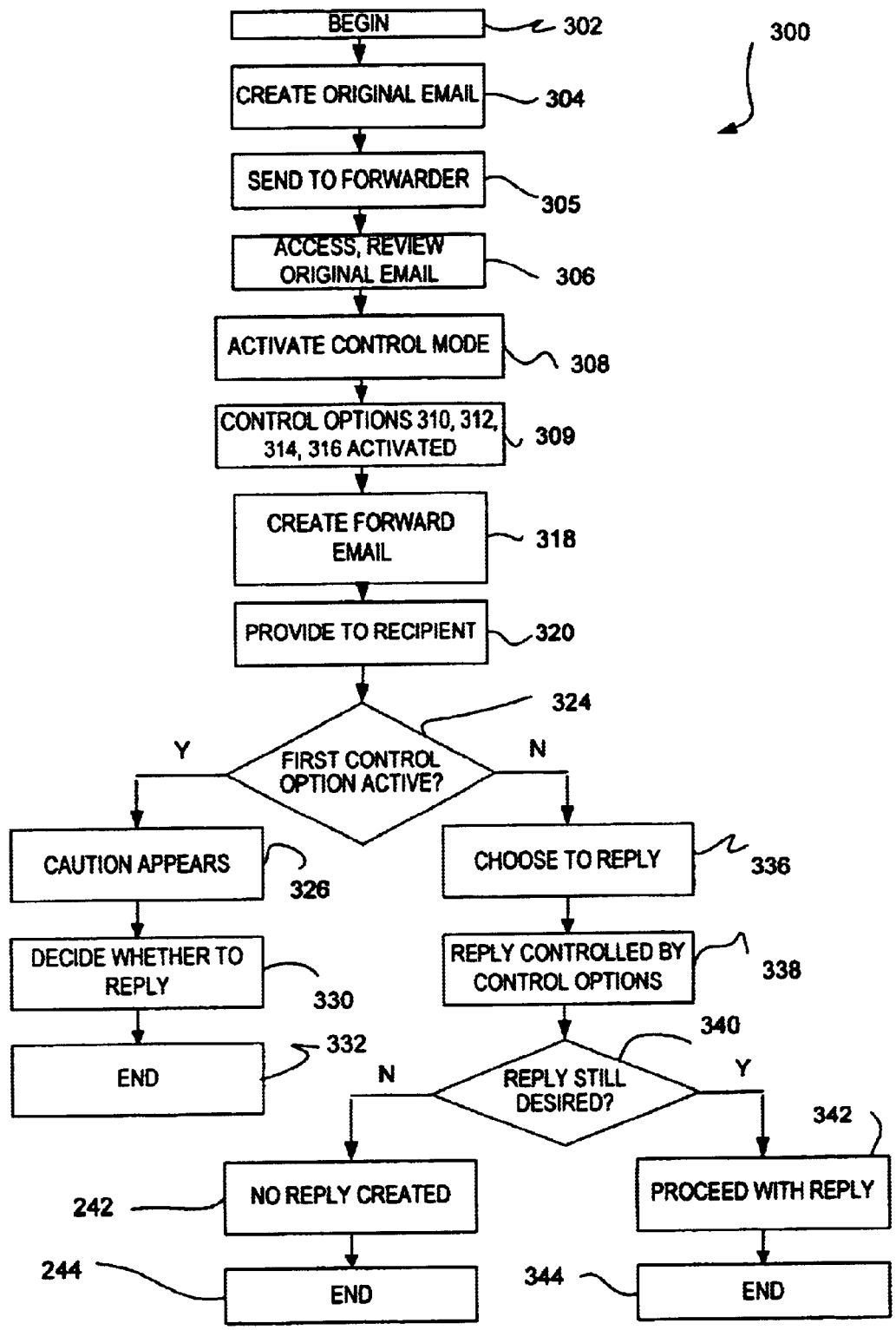
FIG. 3 shows a flow diagram of a forwarder-initiated control mode in accordance with one of many embodiments of the present invention.

FIG. 3 is a flow diagram of logic of a forwarder-initiated control mode 300 in accordance with another embodiment of the present invention. The forwarder-initiated control mode 300 allows the forwarder 104 to control the inadvertent transmission of the reply email 110 from the recipient 108 to the originator 100. At a step 302 the logic begins. The logic proceeds to a step 304 where the originator 100 creates the original email 102. The logic proceeds to a step 305 where the originator 100 sends the original email 102 to the forwarder 104. The logic proceeds to a step 306 where, upon receipt of the original email 102, the forwarder 104 accesses and reviews the original email 102. The logic proceeds to a step 308 where the forwarder 104 activates a forwarder-initiated control mode. The logic proceeds to a step 309 where the forwarder 104 selects one of four control options to control inadvertent replies from the recipient 108 to the originator 100 when the original email 102 is provided as an attachment to a forward email 106 by the forwarder 104. In one embodiment of the present invention, one or more of the four control options is selected by the forwarder 104. In a different embodiment, one or more of the four control options is activate without affirmative selection by the forwarder 104.

A first control option 310 causes the appearance of a caution in the original email 102 when the original email is forwarded by the forwarder 104. In an embodiment of the present invention, the caution is a conspicuous message added to the text of the original email 102, indicating "Please do not inadvertently reply to the author of this email." Of course, other kinds of cautions having similar meaning are possible.

A second control option 312 causes the appearance of a caution in the original email 102, the forward email 106, or the reply email 110 after the recipient 108 chooses to reply by an appropriate mouse (double) click of a reply icon. In an embodiment of the present invention, the caution likewise is a conspicuous message added to the text of the email indicating "Please do not inadvertently reply to the author of this email." Of course, other kinds of cautions are possible.

A third control option 314 causes the appearance of a confirmation request after the recipient 108 chooses to reply by an appropriate mouse (double) click of a reply icon. The confirmation request appears in a pop-up window, asking the recipient 108 "Are you sure you want to reply to author of the attachment?" Of course, other confirmation requests having similar meaning or other methods to request confirmation that a reply is intended are possible. The pop-up window includes a yes icon and a no icon. Selection of the yes icon by the recipient 108 allows the recipient 108 to reply to the originator 100. Selection of the no icon by the recipient 108 causes abortion of the attempt by the recipient 108 to reply to the originator 100. Selection of the third control option 314 thus requires the recipient 108 to affirmatively confirm that the reply to originator 100 is intentional.

A fourth control option 316 modifies the normal function of the reply icon temporarily when the recipient 108 tries to reply to the originator 100 with an appropriate mouse (double) click of the reply icon. If the recipient 108 intends to reply to the originator 100, the recipient 108 must key in character by character the email address of the originator 100. Selection of the fourth control option 316 ensures that the recipient 108 is unlikely to mistakenly reply to the originator 100 by a hasty or thoughtless selection of the reply icon.

After selection of a control option, the logic proceeds to a step 318 where the forwarder 104 creates the forward email 106, including the attached original email 102, subject to the control of the selected control option. The logic proceeds to a step 320 where the forward email is provided to the recipient 108. The logic proceeds to a decision step 324 where the logic determines if the forwarder 104 selected the first control option 310. If the first control option 310 was selected, the logic proceeds to a step 326 where the caution of the first control option 310 is generated to appear in the original email 102. The logic proceeds to a step 330 where the recipient 108, after accessing the original email 302 and viewing the caution therein, decides whether to reply to the originator 100. The logic proceeds to a step 332 where the logic ends.

If the first control option 310 was not selected at the decision step 324, the logic proceeds to a step 336 where the recipient 108, after accessing the original email 102, chooses to reply to the originator 100 and appropriately selects a reply icon for such reply. The logic proceeds to a step 338 where the reply by the recipient 108 is appropriately controlled by the second control option 312, the third control option 314, or the fourth control option 316, as discussed above. If the second control option 312 was selected, the caution is displayed as a message to the recipient 108. If the third control option 314 was selected, the confirmation request is displayed to the recipient 108 who selects the yes icon or the no icon. If the fourth control option 316 was selected, the recipient 108 must first manually enter the email address of the originator 100 before replying to the originator 100.

From the step 338, the logic proceeds to a decision step 340. At the decision step 340, the recipient 108 considers whether a reply to the originator 100 is still desired. If a reply is still desired, the logic proceeds from the decision step 340 to a step 342 where the recipient 108 proceeds with the reply email 110 to the originator 100. For the second control option 312, the recipient 108 proceeds with creating the reply email 110 by inputting a message, for example, textual, graphical, or otherwise, and attaching a new attachment, if any, and providing the reply email 110 to the originator 100 by transmitting the reply with a selection, or (double) click, of an appropriate icon. For the third control option 314, the recipient selects the yes icon and then proceeds in like manner as the second control option 312, as just described. For the fourth control option 316, the recipient 108 first manually, audibly, or otherwise enters the email address of the originator 100 and then proceeds in like manner as the second control option 312, as just described. The logic proceeds from the step 342 to a step 344 where the logic ends. If a reply is not desired at the decision step 340, the logic proceeds to a step 346 where no reply by the recipient 108 is created for the originator 100. From the step 346, the logic proceeds to a step 348 where the logic ends.

Figure 4:
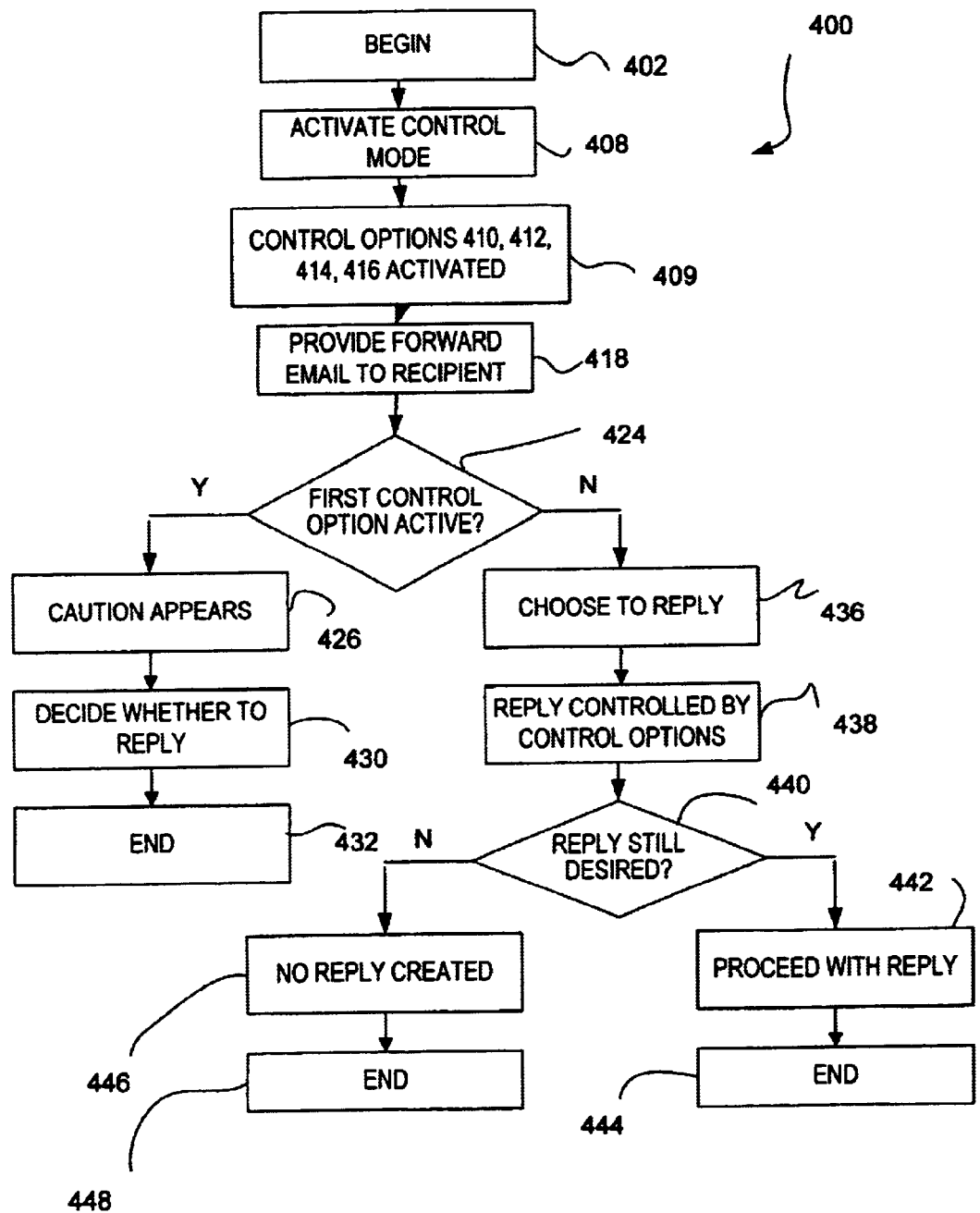
FIG. 4 shows a flow diagram of a recipient-initiated control mode in accordance with one of many embodiments of the present invention.

FIG. 4 is a flow diagram of logic of a recipient-initiated control mode 400 in accordance with another embodiment of the present invention. The recipient-initiated control mode 400 allows the recipient 108 to control the inadvertent transmission of the reply email 110 from the recipient 108 to the originator 100. At a step 402 the logic begins. The logic proceeds to a step 408 where the recipient 108 activates the recipient-initiated control mode. The logic proceeds to a step 409 where the recipient 108 selects one of four control options to control inadvertent replies from the recipient 108 to the originator 100 when the original email 102 is provided as an attachment to a forward email 106 by the forwarder 104. In one embodiment of the present invention, one or more of the four control options is selected by the recipient 108. In a different embodiment, one or more of the four control options is active without affirmative selection by the recipient 108.

A first control option 410 causes the appearance of a caution in the original email 102 when the original email is forwarded by the forwarder 104. In an embodiment of the present invention, the caution is a conspicuous message added to the text of the original email 102, indicating "Please do not inadvertently reply to the author of this email." Of course, other kinds of cautions having similar meaning are possible.

A second control option 412 causes the appearance of a caution in the original email 102, the forward email 106, or the reply email 110 after the recipient 108 chooses to reply by an appropriate mouse (double) click of a reply icon. In an embodiment of the present invention, the caution likewise is a conspicuous message added to the text of the email indicating "Please do not inadvertently reply to the author of this email." Of course, other kinds of cautions are possible.

A third control option 414 causes the appearance of a confirmation request after the recipient 108 chooses to reply by an appropriate mouse (double) click of a reply icon. The confirmation request appears in a pop-up window, asking the recipient 108 "Are you sure you want to reply to author of the attachment?" Of course, other confirmation requests having similar meaning are possible. The pop-up window includes a yes icon and a no icon. Selection of the yes icon by the recipient 108 allows the recipient 108 to reply to the originator 100. Selection of the no icon by the recipient 108 causes abortion of the attempt by the recipient 108 to reply to the originator 100. Selection of the third control option 414 thus requires the recipient 108 to affirmatively confirm that the reply to originator 100 is intentional.

A fourth control option 416 renders the reply icon temporarily inoperable when the recipient 108 tries to reply to the originator 100 with an appropriate mouse (double) click of the reply icon. If the recipient 108 intends to reply to the originator 100, the recipient 108 must key in character by character the email address of the originator 100. Selection of the fourth control option 416 ensures that the recipient 108 is unlikely to mistakenly reply to the originator 100 by a hasty or thoughtless selection of the reply icon.

After selection of an control option, the logic proceeds to a step 418 where the forward email 106, including the attached original email 102, is provided to the recipient 108 and subject to the control of the selected control option. The logic proceeds to a decision step 424 where the logic determines if the recipient 108 selected the first control option 410. If the first control option 410 was selected, the logic proceeds to a step 426 where the caution of the first control option 410 is generated to appear in the original email 102. The logic proceeds to a step 430 where the recipient 108, after accessing the original email 102 and viewing the caution therein, decides whether to reply to the originator 100. The logic proceeds to a step 432 where the logic ends.

If the first control option 410 was not selected at the decision step 424, the logic proceeds to a step 436 where the recipient 108, after accessing the original email 102, chooses to reply to the originator 100 and appropriately selects a reply icon for such reply. The logic proceeds to a step 438 where the reply by the recipient 108 is appropriately controlled by the second control option 412, the third control option 414, or the fourth control option 416, as discussed above. If the second control option 412 was selected, the caution is displayed as a message to the recipient 108. If the third control option 414 was selected, the confirmation request is displayed to the recipient 108 who selects the yes icon or the no icon. If the fourth control option 416 was selected, the recipient 108 must first manually enter the email address of the originator 100 before replying to the originator 100.

From the step 438, the logic proceeds to a decision step 440. At the decision step 440, the recipient 108 considers whether a reply to the originator 100 is still desired. If a reply is still desired, the logic proceeds from the decision step 440 to a step 442 where the recipient 108 proceeds with the reply email 110 to the originator 100. For the second control option 412, the recipient 108 proceeds with creating the reply email 110 by inputting a message, for example, textual, graphical, or otherwise, and attaching a new attachment, if any, and providing the reply email 110 to the originator 100 by transmitting the reply with a selection, or (double) click, of an appropriate icon. For the third control option 414, the recipient selects the yes icon and then proceeds in like manner as the second control option 412, as just described. For the fourth control option 416, the recipient 108 first manually, audibly, or otherwise enters the email address of the originator 100 and then proceeds in like manner as the second control option 412, as just described. The logic proceeds from the step 442 to a step 444 where the logic ends. If a reply is not desired at the decision step 440, the logic proceeds to a step 446 where no reply by the recipient 108 is created for the originator 100. From the step 446, the logic proceeds to a step 448 where the logic ends.

Figure 5:
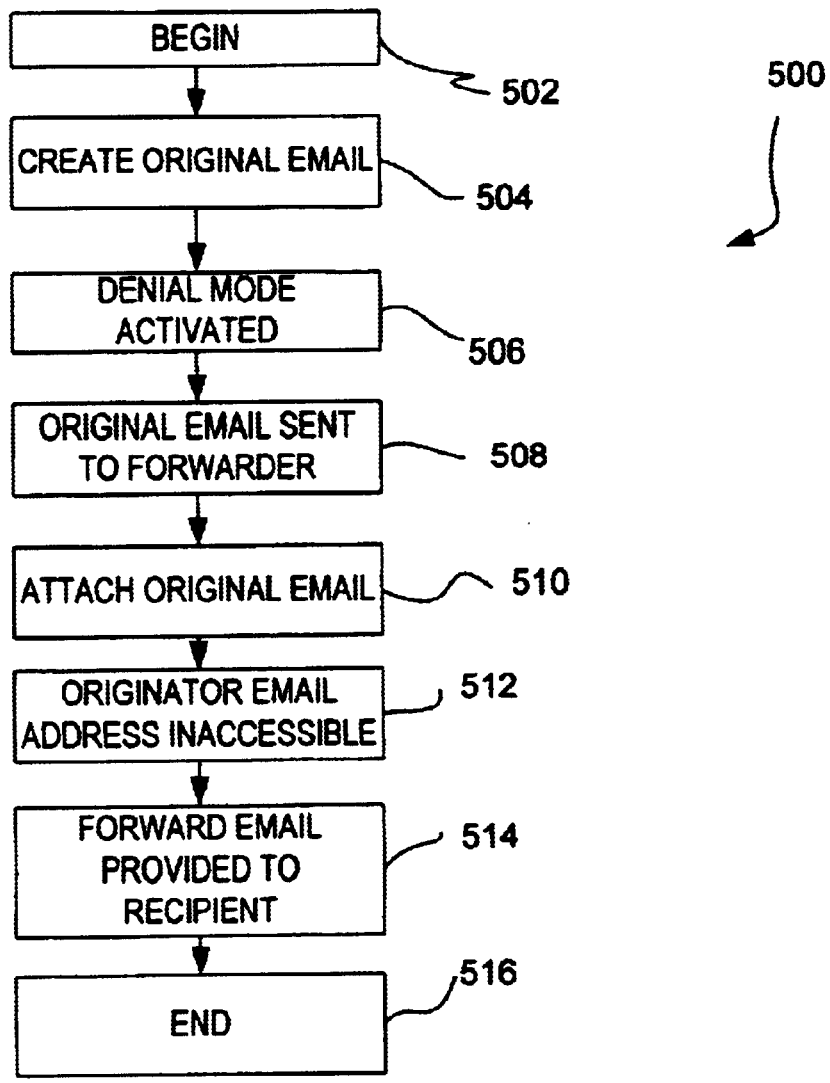
FIG. 5 shows a flow diagram of an originator-initiated access denial mode in accordance with one of many embodiments of the present invention.

FIG. 5 is a flow diagram of logic of an originator-initiated access denial mode 500 in another embodiment of present invention. The originator-initiated access denial mode 500 allows the originator 100 to prevent any reply by the recipient 108 to the originator 100. The logic begins at a step 502 and proceeds to a step 504 where the originator 100 creates the original email 102. The logic proceeds to a step 506 where the originator initiated access denial mode 500 is activated. In one embodiment of the originator-initiated access denial mode 500 in connection with a first control option, the address of the originator 100 in the original email 102 is password protected and not readily accessible or readable to others. The password is created or selected by the originator 100. The password is provided to the forwarder 104 over, for security reasons, a medium different than the network to carry the original email 102. If the originator 100 does not desire that the recipient 108 reply to the originator 100, the password is not provided to recipient so that the recipient cannot reply. In another embodiment of a second control option of the access denial mode 500, the email address of the originator 100 is automatically erased after the original email is attached to another email, or some other predetermined event, so that the recipient cannot reply to the originator 100. Other means of rendering the email address of the originator 100 inaccessible are possible as well in accordance with the present invention.

The logic proceeds to a step 508 where the original email 102 is sent by the originator 100 to the forwarder 104. The logic proceeds to a step 510 where the forwarder 104 attaches the original email 100 to the forward email 106 for ultimate provision to the recipient 108. The logic proceeds to a step 512 where the email address of the originator 100 is rendered inaccessible in the original email 100 upon attachment of the original email to the forward email, or some other predetermined event. As stated above, the email address of the originator 100 is rendered inaccessible by the erasure of the email address or password protection of the email address. Other techniques to render the email address of the originator 100 inaccessible are possible. In this way, wherever the forwarder 104 provides the forward email 106, including the original email 100, no reply to the originator 100 by the recipient 108 is possible because the recipient 108 cannot access the email address of the originator 100. Reply by the forwarder 104 to the originator 100, without attaching the original email 100, is still possible in this embodiment. Since the forwarder 104 would not likely attach the original email 102 in creating a reply to the originator 100, the email address of the originator 100 is not rendered inaccessible. The logic proceeds to a step 514 where the forward email 106 is provided to the recipient 108. The logic proceeds to a step 516 where the logic ends.

Figure 6:
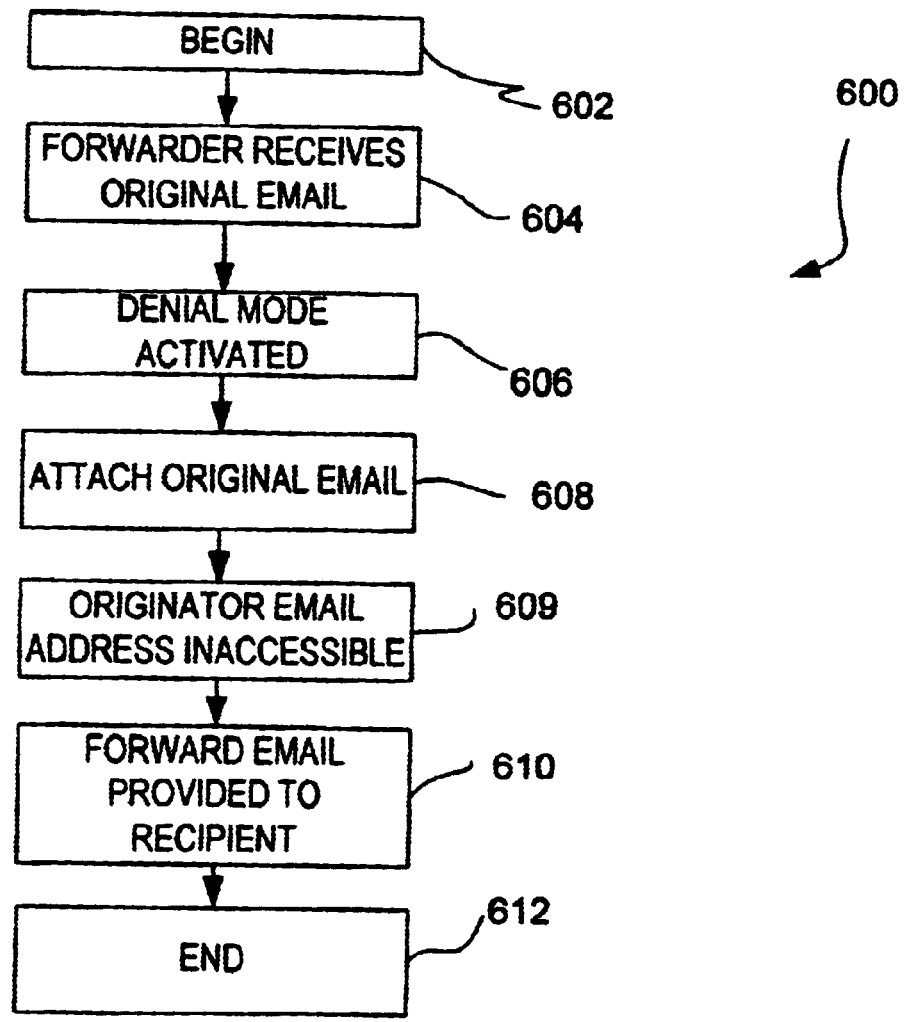
FIG. 6 shows a flow diagram of a forwarder-initiated access denial mode in accordance with one of many embodiments of the present invention.

FIG. 6 is flow diagram of logic of a forwarder-initiated access denial mode 600 in yet another embodiment of the present invention. The forwarder-initiated access denial mode 600 allows the forwarder 104 to prevent any reply by the recipient 108 to the originator 100. The logic begins at a step 602 and proceeds to a step 604 where the forwarder 104 receives an original email 102 from the originator 100. The logic proceeds to a step 606 where the forwarder 104 activates the forwarder-initiated access denial mode 600. In one embodiment of the forwarder-initiated access denial mode 600 in connection with a first control option, the email address of the originator 100 in the original email 102 is password protected and not readily accessible or readable to others. The password is created or selected by the forwarder 104. If the forwarder does not desire that the recipient 108 reply to the originator 100, the password is not provided to recipient so that the recipient cannot reply. In another embodiment of the present invention in connection with a second control option of the access denial mode 600, the email address of the originator 100 is automatically erased after the original email is attached to the forward email 106, or some other predetermined event, so that the recipient cannot reply to the originator 100. Other means of rendering the email address of the originator 100 inaccessible are possible as well in accordance with the present invention.

The logic proceeds to a step 608 where the forwarder 104 creates the forward email 106 and attaches the original email 100. The attachment of the original email 100 causes the email address of the originator 100 to be rendered inaccessible to the recipient 108 of the forward email 106 including the original email 100. As stated above, the email address of the originator 100 is rendered inaccessible by the erasure of the email address or password protection of the email address. Other techniques to render the email address of the originator 100 inaccessible are possible. In this way, wherever the forwarder 104 provides the forward email 106, including the original email 100, no reply to the originator 100 by the recipient 108 is possible because the recipient cannot access the email address of the originator 100. The logic proceeds to a step 609 where the email address of the originator is rendered inaccessible. The logic proceeds to a step 610 where the forward email 106 is provided to the recipient 108. The logic proceeds to a step 612 where the logic ends.

Figure 7:
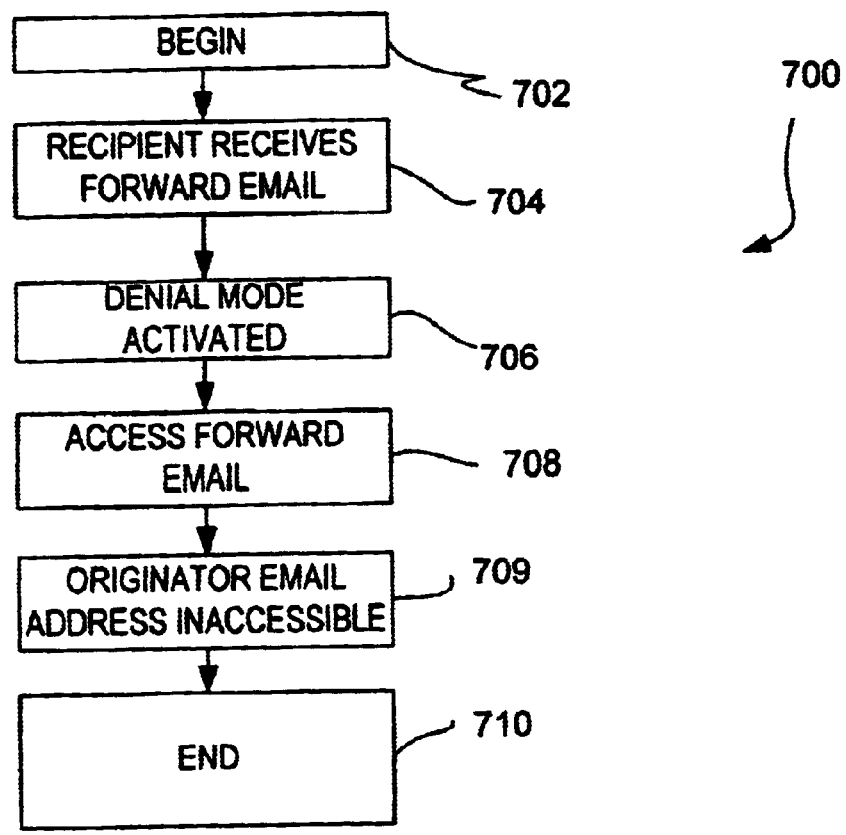
FIG. 7 shows a flow diagram of a recipient-initiated access denial mode in accordance with one of many embodiments of the present invention.

FIG. 7 is a flow diagram of logic of a recipient-initiated access denial mode 700 in yet a further embodiment of the present invention. The recipient-initiated access denial mode 700 allows the recipient 108 to prevent any reply by the recipient 108 to the originator 100. The logic begins at a step 702 and proceeds to a step 704 where the recipient 108 receives the forward email 106, including the original 102. The logic proceeds to a step 706 where the recipient 108 activates the recipient-initiated access denial mode 700. In one embodiment of the recipient-initiated access denial mode 700 in connection with a first control option, the address of the originator 100 in the original email 102 is password protected and not readily accessible or readable to others. The password is selected or created by a trustee of the recipient as a precaution of the recipient. If the recipient does not desire that the recipient 108 reply to the originator 100, the password is not provided to recipient so that the recipient cannot reply. In another embodiment of the present invention in connection with a second control option of the access denial mode 700, the email address of the originator 100 is automatically erased upon receipt of the original email in the mailbox of the recipient 108, or some other predetermined event, so that the recipient 108 cannot reply to the originator 100. Other means of rendering the email address of the originator 100 inaccessible are possible as well in accordance with the present invention.

The logic proceeds to a step 708 where the recipient 108 accesses the forward email 106. The logic proceeds to a step 709 where the email address of the originator 100 is rendered inaccessible by the recipient 108. As stated above, the email address of the originator 100 is rendered inaccessible by the erasure of the email address or password protection of the email address. Other techniques to render the email address of the originator 100 inaccessible are possible. In this way, the recipient 108 is prevented from replying to the originator 100. The logic proceeds to a step 710 where the logic ends.

While the preferred embodiment, and alternative embodiments, has been illustrated and described, it will be appreciated that various changes can be made therein without departing from the spirit and scope of the invention. For example, the embodiments of the present invention have discussed cautions and confirmation requests exemplarily as textual messages. It will be appreciated that such cautions and confirmation requests could also be in the form of graphical, video, or audio messages.

Furthermore, with respect to the control options discussed, it will be appreciated that various control options can be available for desired selection by the originator 100, the forwarder 104, or the recipient 108, as the case may be. However, it will be appreciated that the present invention also includes systems and methods that involve the use of only one or more of the control options, obviating the need for selection.

It should also be appreciated that the various embodiments of the present invention, as discussed in isolation, could be freely combined together in whole or in part to form yet still other embodiments of the present invention which have not been explicitly described herein. For example, some features or steps discussed in connection with FIG. 2 could be freely combined with other features or steps discussed in connection with FIG. 3 in accordance with the present invention. As another example, the control options of the control modes and the access denial modes could be combined in any manner or combination.

In addition, it will be readily appreciated that, in accordance with the present invention, some features or steps of an embodiment of the present invention that has been discussed herein could be omitted to form yet still other embodiments.

Furthermore, the precise order of the steps discussed above are exemplary only. The steps of an embodiment discussed above could be also arranged in different sequence in accordance with the present invention. For example, the caution of the second control option 212 was exemplarily discussed to appear after the recipient 108 chooses to reply by an appropriate selection of the reply icon. The present invention also covers appearance of such a caution before selection of the reply icon, during transmission of the forward email 104, during creation of the reply email, or any one of many other predetermined events. As another example, the discussion above described the erasure of the originator's email address. The precise timing of such erasure is variable as well in accordance with the present invention. The email address of the originator could be erased upon transmission of the original email to the forwarder 104, upon access of the original email 102 by the forwarder 104, upon transmission of the forward email 106 to the recipient 108, upon access of the forward email 106 by the recipient 108, etc. As yet another example, the activation of the various modes discussed above can occur at various times other than as explicitly set forth above. For example, with respect to the embodiment shown in FIG. 2, the activation of the control mode 200 at step 206 occurs before the original email 102 is created. However, step 206 could occur after step 218 and, for that matter, at any one of many other possible predetermined times. The precise timing of certain steps and features discussed above are variable in accordance with the present invention.

It will also be appreciated that certain steps or features of the present invention could occur in various manners. For example, the generation of a password in an access denial mode could entail selection or creation by a user of a device.

However, it should be appreciated that the password could also be generated by other sources. For example, the device itself that is receiving or transmitting email, or another separate electronic apparatus, could generate a password for acceptance by the user. Other methods are possible as well.

Consequently, within the scope of the appended claims, it will be appreciated that the present invention can be practiced in various manners otherwise than as specifically described herein.

I claim:

1. A method for controlling email transmission comprising:
   creating a first email by a first user having an email address;
   sending the first email to a second user;
   attaching the first email to a second email created by the second user;
   forwarding the second email, including the first email, to a third user; and
   subjecting the third user to a control mode to prevent undesired reply to the first email before a third email created by the third user is sent in reply to the first email.

2. The method of claim 1 wherein the control mode includes cautioning the third user.

3. The method of claim 1 wherein the control mode includes requesting confirmation from the third user.

4. The method of claim 1 wherein the control mode includes creating the third email from the third user to the first user without automatic entry of the email address of the first user in the third email.

5. The method of claim 1 further comprising allowing the first user to activate the control mode.

6. The method of claim 1 further comprising allowing the second user to activate the control mode.

7. The method of claim 1 further comprising allowing the third user to activate the control mode.

8. The method of claim 1 wherein portions of the control mode are applied at various stages.

9. A method for controlling email transmission comprising:
   creating a first email by a first user having an email address in the first email;
   sending the first email to a second user;
   attaching the first email to a second email;
   forwarding th e second email, including the first email, to a third user;
   controlling the third user in creating a third email to reply to the first user after the third user's receipt of and access to the second email and the first email; and
   activating an access denial mode to prohibit the third user in replying to the first user.

10. The method of claim 9 further comprising password protecting the email address of the first user.

11. The method of claim 9 further comprising erasing the email address of the first user.

12. The method of claim 9 further comprising allowing an originator as the first user to activate the access denial mode.

13. The method of claim 9 further comprising allowing a forwarder as the second user to activate the access denial mode.

14. The method of claim 9 further comprising allowing a recipient as the third user to activate the access denial mode.

15. A method of selectively communicating among a first user, a second user and a third user over a network comprising:
   providing a first email created by the first user having an email address;
   transmitting the first email to the second user;
   attaching the first email to a second email created by the second user;
   transmitting the second email with the first email to the third user;
   reviewing the first email by the third user; and
   controlling the third user in creating and sending a third email responsive to the first email from the third user to the first user based on a control option selected from the group consisting of
   a first control option of a control mode,
   a second control option of the control mode,
   a third control option of the control mode,
   a fourth control option of the control mode,
   a first control option of an access denial mode, and
   a second control option of the access denial mode
   wherein
   the first control option of the control mode includes cautioning;
   the second control option of the control mode includes cautioning;
   the third control option of the control mode includes requesting confirmation;
   the fourth control option of the control mode includes prohibiting automatic entry of the email address of the first user;
   the first control option of the access denial mode includes password protecting the email address of the first user; and
   the second control option of the access denial mode includes erasing the email address of the first user.

16. A system for controlling electronic messages comprising:
   a first electronic device capable of creating a first message;
   a second electronic device, communicatively linked to the first electronic device over a network, capable of creating a second message attaching the first message; and
   a third electronic device communicatively linked to the first electronic device and the second electronic device over the network, capable of receiving the second message attaching the first message, and capable of creating and sending a third message to the first electronic device in response to the first message, the third electronic device having and subject to a control option for selectively controlling undesired creation and transmission of the third message before the third message is transmitted in response to the first message.

17. The system of claim 16 wherein the first electronic device, the second electronic device, and the third electronic device are computers.

18. The system of claim 16 wherein the network is the Internet.

19. The method of claim 16 wherein the control option is selectable from a control mode or an access denial mode.

20. A computer-readable medium whose contents cause a computing device to control communication, by a method comprising:
   receiving a forward email including an original email that is attached to the forward email; and
   applying a control mode to control creation of a reply email, in reply to the original email, to prevent undesired transmission of the reply email, before the reply email is transmitted.

21. The computer-readable medium of claim 20 wherein the control mode is applied over various stages of the creation of the original email, the forward email, and the reply email.

22. The computer-readable medium of claim 20 wherein the control mode is initiated during creation of the original email.

23. The computer-readable medium of claim 20 wherein the control mode is initiated during creation of the forward email.

24. The computer-readable medium of claim 20 wherein the control mode is initiated during creation of the reply email.

25. The computer-readable medium of claim 20 wherein the control mode includes cautioning.

26. The computer-readable medium of claim 20 wherein the control mode includes requesting confirmation.

27. The computer-readable medium of claim 20 wherein the control mode includes creation of the reply email in reply to the original email without automatic insertion of an email address associated with the original email.

28. The computer-readable medium of claim 20 wherein the acts comprising the method are performed sequentially.

29. A computer-readable medium containing instructions for controlling a computer system to handle email, by a method comprising:
    receiving a forward email including an original email that is attached to the forward email; and
    applying an access denial mode to selectively prohibit transmission of a reply email in reply to the original email by rendering an email address associated with the original email not readily accessible.

30. The computer readable medium of claim 29 wherein the applying an access denial mode includes password protecting the email address associated with the original email.

31. The computer readable medium of claim 29 wherein the applying an access denial mode includes erasing the email address associated with the original email.

32. The computer readable medium of claim 29 wherein the applying an access denial mode is activated during creation of the original email.

33. The computer readable medium of claim 29 wherein the applying an access denial mode is activated during creation of the forward email.

34. The computer readable medium of claim 29 wherein the applying an access denial mode is activated during creation of the reply email.

35. The computer readable medium of claim 29 wherein the applying an access denial mode occurs at various stages during creation of the original email, the forward email, and the reply email.

36. The computer readable medium of claim 29 wherein the applying an access denial mode includes allowing transmission of the reply email in reply to the original email only after a password is provided.

37. The computer readable medium of claim 29 wherein the applying an access denial mode includes allowing transmission of the reply email in reply to the original email only after an email address associated with the original email is provided.

38. The computer readable medium of claim 29 wherein the acts comprising the method are performed sequentially.

* * * * *